(12) United States Patent
Kodaira et al.

(10) Patent No.: US 8,175,806 B2
(45) Date of Patent: May 8, 2012

(54) CAR NAVIGATION SYSTEM

(75) Inventors: Naoaki Kodaira, Hino (JP); Hiroyuki Mizutani, Yokohama (JP); Tomohisa Suzuki, Yokohama (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 505 days.

(21) Appl. No.: 12/524,824

(22) PCT Filed: Jan. 25, 2008

(86) PCT No.: PCT/JP2008/000092
§ 371 (c)(1),
(2), (4) Date: Jul. 28, 2009

(87) PCT Pub. No.: WO2008/093493
PCT Pub. Date: Aug. 7, 2008

(65) Prior Publication Data
US 2010/0121561 A1    May 13, 2010

(30) Foreign Application Priority Data
Jan. 29, 2007    (JP) ................................ P2007-017868

(51) Int. Cl.
*G01C 21/00* (2006.01)
*G06T 1/00* (2006.01)
*G08G 1/0969* (2006.01)
*G08G 1/16* (2006.01)
*H04N 5/225* (2006.01)
*H04N 7/18* (2006.01)

(52) U.S. Cl. .................. 701/523; 382/104; 348/118

(58) Field of Classification Search ............ 701/523
See application file for complete search history.

(56) References Cited

U.S. PATENT DOCUMENTS

| 6,621,524 | B1 * | 9/2003 | Iijima et al. | 348/584 |
| 7,421,095 | B2 * | 9/2008 | Ikeda et al. | 382/104 |
| 2001/0056326 | A1 * | 12/2001 | Kimura | 701/208 |
| 2004/0004626 | A1 * | 1/2004 | Ida et al. | 345/626 |
| 2005/0171688 | A1 | 8/2005 | Fujita et al. | |
| 2009/0088978 | A1 * | 4/2009 | Ishikawa et al. | 701/223 |

FOREIGN PATENT DOCUMENTS

| DE | 10 2005 004 112 A1 | 8/2005 |
| JP | 06-186047 | 7/1994 |
| JP | 2005-214883 | 8/2005 |
| JP | 2006-011671 | 1/2006 |
| WO | WO 2005/111937 A1 * | 11/2005 |
| WO | WO 2007/018145 A1 * | 2/2007 |

OTHER PUBLICATIONS

International Preliminary Report on Patentability issued by The International Bureau of WIPO on Sep. 17, 2009, for International Application No. PCT/JP2008/000092.
International Search Report issued by the Japanese Patent Office on May 13, 2008, for International Application No. PCT/JP2008/000092.

\* cited by examiner

*Primary Examiner* — Michael J. Zanelli
(74) *Attorney, Agent, or Firm* — Finnegan, Henderson, Farabow, Garrett & Dunner, L.L.P.

(57) ABSTRACT

To improve recognition accuracy of a traveling direction of a vehicle by accurately detecting a marking on a road surface which is photographed by a camera while a road environment where a vehicle travels is changing. A car navigation system 100 detects an image of a light-irradiated portion which is unnecessary for the recognition of a road marking, in an image behind a vehicle captured by a camera 6 mounted on the vehicle, clips out image areas in a predetermined shape excluding the detected image area, and sequentially stores the clipped images in a storage unit 7b. Then, the new clipped image and the clipped image already stored in the storage unit 7b are combined, and an image of a road marking is detected and recognized from the composite image.

9 Claims, 12 Drawing Sheets

CAR NAVIGATION SYSTEM

TECHNICAL FIELD

The present invention relates to a car navigation system which finds a current traveling direction of a vehicle based on traffic directional markings (an ahead only marking, right turn only marking, a left turn only marking, the combination of these, and the like) painted on a road surface to guide the vehicle to a destination.

BACKGROUND ART

There has been known a car navigation system which specifies a current position of an own vehicle on a road by using a position detector such as GPS (Global Positioning System) and map information and offers travel guidance such as the display of a road route to a destination designated by a user.

Conventionally, there has been disclosed an art of a car navigation system which specifies a lane where the vehicle is traveling, by capturing an image of a directional marking on a road surface by a camera and recognizing the directional marking from the captured image (see, for example, JP-A 2005-214883(KOKAI)).

Consequently, it is possible to determine, from the directional marking painted on the road surface, whether or not the vehicle is traveling on a lane directed toward a road route as instructed, so that proper guidance can be offered to the user.

Patent reference 1: JP-A 2005-214883(KOKAI)

DISCLOSURE OF THE INVENTION

However, the camera photographs not only the directional markings on the road surface but also surrounding scenery (landscape and the like).

Such a scenery image sometimes becomes an image not suitable for the recognition of a road marking because image quality changes according to a change in a road surface condition depending on the weather such as a rainy weather and according to a change in brightness between day and night such as whitening of a video due to a light or the like of a vehicle behind especially at night, because there is an influence of a shadow of another vehicle traveling on the side, and because the road marking is hidden by an unnecessary object on a roadside such as a guardrail or a pole, and as a result, accuracy in the recognition of the traveling direction of the vehicle is sometimes lowered.

The present invention was made to solve such problems and an object thereof is to provide a car navigation system which is capable of accurately recognizing a road marking from an image including a road which is captured by a camera while an environment of a road where a vehicle is traveling is changing, and is capable of having improved accuracy in the recognition of a traveling direction of a vehicle.

In order to attain the above object, a car navigation system of the present invention includes: a camera mounted on a vehicle, with a shooting direction directed forward or backward from the vehicle, and capturing an image including at least a road surface in front of or behind the vehicle; a storage unit in which the image captured by the camera is stored; a first image processing unit detecting an area unnecessary for recognition of a road marking included in the image captured by the camera; a second image processing unit combining an old image already stored in the storage unit or a partial image area of the old image as a complement for the unnecessary area detected in the image by the first image processing unit, to generate a composite image; and a marking recognizing unit detecting and recognizing the road marking painted on the road surface by using the composite image generated by the second image processing unit and pre-set marking information.

A car navigation system of the present invention includes: a camera mounted on a rear part of the vehicle, with a shooting direction directed backward from the vehicle and capturing a video including at least a road surface behind the vehicle; a storage unit in which an image is storable; and a screen downloading unit sequentially downloading the videos captured by the camera into the storage unit at predetermined time intervals in a unit of a screen; an unnecessary area detecting unit detecting an area unnecessary for recognition of a road marking included in the image of the screen downloaded into the storage unit; an image clip-out unit clipping out an image area in a predetermined shape not including the unnecessary area detected by the unnecessary area detecting unit, to store the clipped image area into the storage unit; a movement amount calculating unit calculating a movement amount by comparing the new image area stored in the storage unit by the image clip-out unit and an immediately preceding old image area already stored in the storage unit; an image combining unit generating a composite image by combining the new and old image areas according to the movement amount of the road marking calculated by the movement amount calculating unit; and a road marking recognizing unit detecting and recognizing the road marking by using the composite image generated by the image combining unit and pre-set marking information.

In the present invention, for example, when a road marking as a recognition target is hidden by another vehicle or a shadow of the vehicle, an image captured before the marking is hidden, among images stored in the past, is combined with the newly clipped image, and the mark is detected and recognized by using the composite image, which enables accurate recognition of the road marking such as a traffic directional marking, leading to improved accuracy in the recognition of a traveling direction of the vehicle.

Further, an image area in a good condition suitable for the recognition is clipped out from a scenery image captured by the camera and this image area is combined with an image already stored, which can improve recognition accuracy.

Further, the image area is not simply clipped out, but the unnecessary image area such as a light irradiated area obstructing the recognition of the road marking is excluded, or a past image in a good condition complements the image area from which the unnecessary image area is removed, which enables accurate recognition of the kind of the road marking, leading to improved accuracy in the recognition of the traveling direction of the vehicle.

As described above, according to the present invention, it is possible to accurately recognize a road marking from an image including a road, which is captured by a camera while a road environment in which a vehicle is traveling is changing, and to improve accuracy in the recognition of a traveling direction of a vehicle.

EXPLANATION OF CODES

1 . . . GPS receiver, 2 . . . disk drive, 3 . . . operation input unit, 4 . . . display device, 5 . . . speaker, 6 . . . camera, 7 . . . controller, 7a . . . CPU, 7b . . . storage unit, 7c . . . ROM, 7d . . . flash memory, 10 . . . first image processing unit, 11 . . . screen downloading unit, 12 . . . unnecessary area detecting unit, 13 . . . image clip-out unit, 20 . . . second image processing unit, 21 . . . movement amount calculating unit, 22 . . . image combining unit, 23 . . . unnecessary image removing unit, 30 . . . road marking recognizing unit, 40 . . . navigation unit, 100 . . . car navigation system

BEST MODE FOR CARRYING OUT THE INVENTION

Hereinafter, embodiments of the present invention will be described with reference to the drawings.

Figure 1:
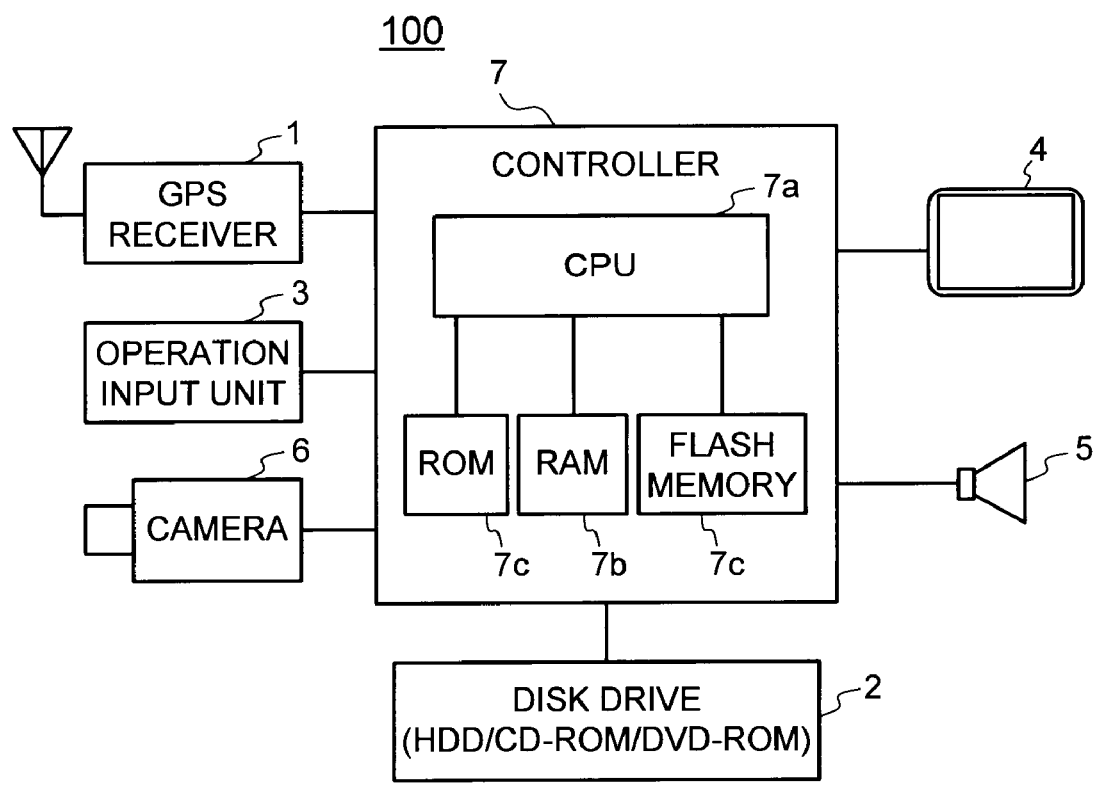
FIG. 1 is a block diagram showing the hardware configuration of a car navigation system of a first embodiment.
Figure 2:
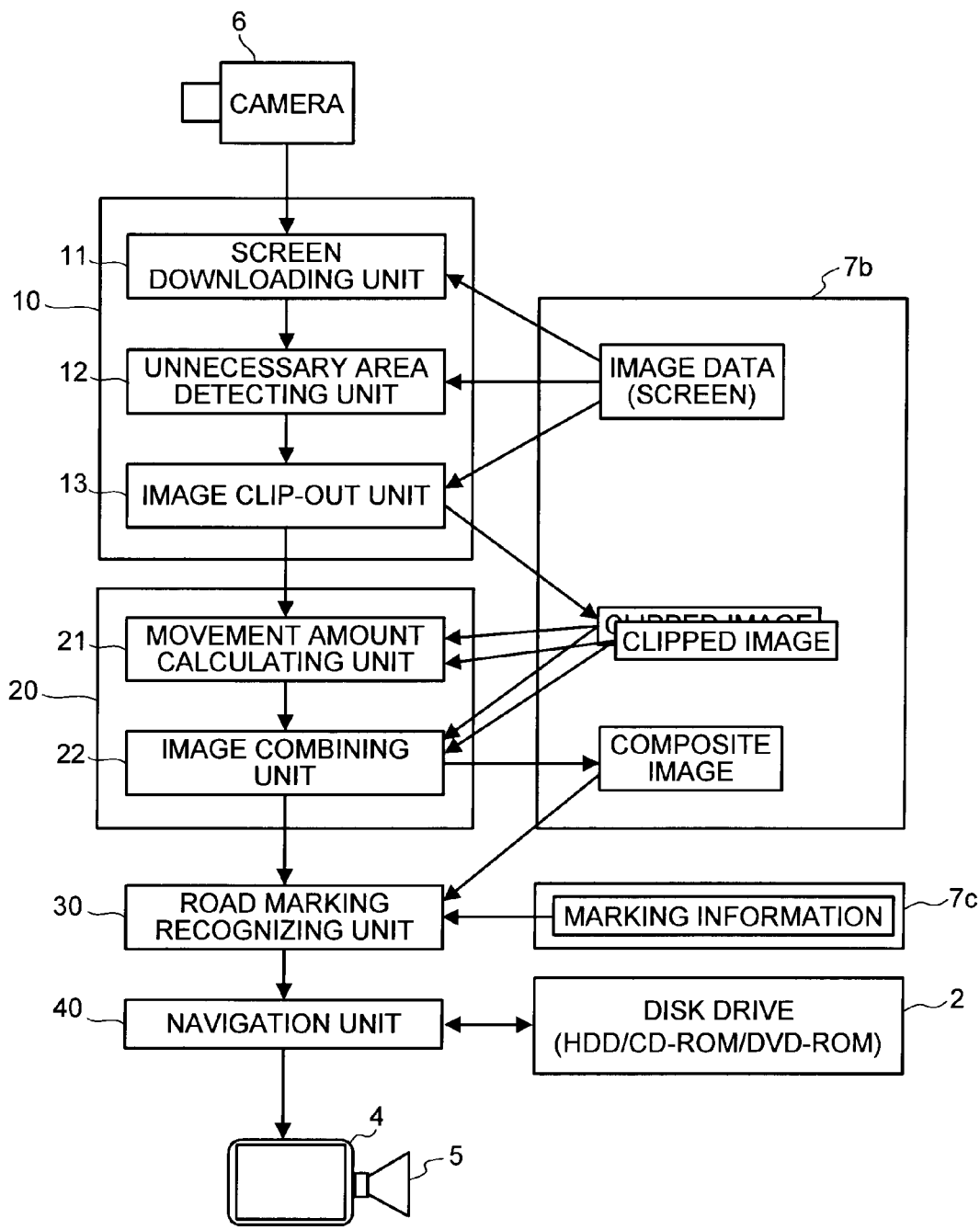
FIG. 2 is a functional block diagram of the car navigation system in FIG. 1.

As shown in FIG. 1 and FIG. 2, a car navigation system 100 of a first embodiment includes: a GPS (Global Positioning System) receiver 1; a disk drive 2 which reads map information and its related information from a medium such as a HD (Hard Disk), a CD-ROM (Compact Disc Read Only Memory), or a DVD-ROM (Digital Versatile Disc Read Only Memory); an operation input unit 3 accepting, from a user, an input of a place of departure, a destination, and the like and an input for various operations; a display device 4 such as a CRT (Cathode Ray Tube) or a LCD (Liquid Crystal Display) displaying the position of an own vehicle (own vehicle position), the map information regarding its vicinities, and information for the navigation of the vehicle; a speaker 5 outputting audio information regarding the navigation; a camera 6 photographing a road surface in front of or behind the vehicle; and a controller 7.

The controller 7 includes a CPU (Central Processing Unit) 7a, a storage unit 7b such as a RAM (Random Access Memory), a ROM (Random Only Memory) 7c in which programs executed by the CPU 7a, various kinds of setting data, and the like are stored in an unrewritable manner (fixedly), and an electrically erasable or rewritable flash memory 7d such as an EEPROM.

The storage unit 7b functions as a work area of the CPU 7a and as a storage area for screen data (image data) obtained when video is downloaded and for data of a partial area (image area) clipped out from its image.

In the ROM 7c, identification data of road markings for informing drivers of, for example, traffic rules of a road are stored as marking information. The road markings are lines, marks, or characters depicted on a road surface by means of road studs, painting, stones, and the like, based on Road Traffic Law and road rules.

The identification data of the road markings is information linking marking images and information specifying the names thereof.

The information specifying the names of the marking images is sometimes the names or sometimes IDs or the numbers. The marking information is used as comparison data at the time of the recognition of the road markings.

The GPS receiver 1 measures a current position of the own vehicle by GPS to detect the current position of the own vehicle (own vehicle position) and inputs the detection result of the own vehicle position to the controller 7.

The camera 6 is attached to a rear part of the vehicle with its shooting direction directed backward from the vehicle and is also called as a back-view monitor or the like.

That is, the camera 6 is mounted on the back (rear part or the like) of a carbody of the own vehicle.

The camera 6 is an image input unit which photographs a road surface portion behind the own vehicle to input, to the controller 7, videos of various kinds of road markings for ahead only, left turn only, right turn only, and the like and various kinds of lines, which are painted on the road surface, scenery in the shooting range, and so on.

That is, the camera 6 captures a video including at least the road surface behind the vehicle.

Concretely, the camera 6 has: an image sensor such as, for example, CCD (Charge-Coupled Devices); and a signal processing circuit converting a signal of the image captured by the image sensor from an analog signal to a digital signal to output the digital signal to the controller 7.

As shown in FIG. 2, the car navigation system 100 includes a first image processing unit 10, a second image processing unit 20, a road marking recognizing unit 30, a navigation unit 40, and so on.

The first image processing unit 10 has a screen downloading unit 11, an unnecessary area detecting unit 12, an image clip-out unit 13, and so on.

The second image processing unit 20 has a movement amount calculating unit 21, an image combining unit 22, and so on.

The screen downloading unit 11 sequentially downloads the videos captured by the camera 6, as image data for each screen in a unit of a screen to the storage unit 7b at predetermined time intervals.

The unnecessary area detecting unit 12 detects an area unnecessary for the recognition of a road marking (an arrow mark for ahead only or the like) which is painted on the road and is included in the image data of the screen downloaded to the storage unit 7b.

For example, in an area of the image captured by the camera 6, an area (light irradiated portion of the road surface) other than an area (necessary area) where background has constant brightness distribution is clipped out as the unnecessary area.

The image clip-out unit 13 clips out the image area in a predetermined shape excluding the unnecessary area detected by the unnecessary area detecting unit 12 to store the clipped image area in the storage unit 7b.

Further, the image clip-out unit 13 functions as a clipped image changing unit which changes the shape or arrangement of the image area which is to be clipped out from the image, according to the movement amount calculated by the movement amount calculating unit 21.

The image clip-out unit 13 changes the position of the image area which is to be clipped out from the image, according to a detected state or a recognized state of the road marking included in the composite image.

Further, the image clip-out unit 13 changes the position or shape of the image area which is to be clipped out from the image, depending on time.

"Depending on time" means that the area which is to be clipped out from the image is changed depending on a bright time zone in the daytime (six in the morning to four in the afternoon or the like), a dim time zone in the evening (four in the evening to seven in the evening or the like), and a dark time zone at night (seven in the evening to six in the morning or the like).

That is, the first image processing unit 10 detects the area necessary for the marking recognition (necessary area), which is a background portion in the area in the image captured by the camera 6 and whose brightness distribution is constant, clips out an area other than the necessary area as the unnecessary area (light irradiated portion of the road surface), and combines another image already stored in the storage unit 7b or its partial area as a complement for the unnecessary area portion.

In an alternative method, the first image processing unit 10 sequentially downloads videos captured by the camera 6, as images at predetermined time intervals (for example, 0.1 second intervals or the like) in a unit of a screen, clips out, from the downloaded image, an image area in a predetermined shape (background portion of the road surface) excluding an image area whose change is equal to or lower than a predetermined value (non-moving light or shadow portion), and stores the clipped image area in the storage unit 7b.

The movement amount calculating unit 21 compares a new image area 224b (see FIG. 10) stored in the storage unit 7b and an immediately preceding old image area 224a (see FIG. 9) which has been already stored in the storage unit 7b, and calculates a movement amount between road markings 222a, 222b.

In this example, the immediately preceding old image is used, but if a sampling period is short, an image which is the newest but two or three may be used.

The image combining unit 22 generates a composite image 225 (see FIG. 11) by combining the new and old image areas 224a, 224b, according to the movement amount between the road markings 222a, 222b calculated by the movement amount calculating unit 21.

That is, the second image processing unit 20 combines the old image already stored in the storage unit 7b or a partial image area thereof as a complement for the unnecessary area portion clipped out by the image clip-out unit 13 from the image downloaded to the storage unit 7b, thereby generating the composite image, and stores the composite image in the storage unit 7b.

In a still another method, the second image processing unit 20 generates the composite image 225 by combining the new and old image areas 224a, 224b according to the movement amount which is calculated by using the new image area 224b stored in the storage unit 7b and the immediately preceding old image area 224a already stored in the storage unit 7b and stores the composite image 225 in the storage unit 7b.

The road surface marking recognizing unit 30 detects a road marking and recognizes the road marking by using the composite image 225, which is generated by and stored in the storage unit 7b by the second image processing unit 20, and the marking information set (stored) in the disk drive 2 or the like in advance.

The navigation unit 40 determines (specifies) the direction in which the vehicle is traveling at an instant of the recognition, according to the recognition result of the road marking recognized by the road marking recognizing unit 30 and navigates the vehicle, that is, guides the vehicle by means of the display device 4 and the speaker 5.

Further, the navigation unit 40 outputs approach information indicating that the own vehicle position is close to a specific point, based on coordinate information on the own vehicle position received by the GPS receiver 1 (see FIG. 1) and the map information stored in the recording medium (hard disk (HD), CD-ROM, DVD-ROM, or the like of the disk drive 2.

The navigation unit 40 calculates a distance between the coordinates of the own vehicle position and the coordinates of the specific point in the map information, and when the distance is equal to or less than a predetermined threshold value, it determines "approach" to the specific point to output the determination result.

Here, an initial state of a variable indicating the approach or not is defined as "0", which indicates the non-approach to the specific point.

That is, when the aforesaid distance calculated by the navigation unit 40 is more than the threshold value, "0" is stored in the variable, and when the aforesaid distance is equal to or less than the threshold value, "1" is stored therein.

This variable is given to the CPU 7a, and the control by the CPU 7a is to activate the camera 6 when "1" is stored in the variable.

Information on the coordinates of the specific point is stored in advance in a database configured in the disk drive 2 (see FIG. 1).

The navigation unit 40 searches the database for the coordinates of the closest specific point based on the coordinates of the own vehicle position as a key.

Further, as values of the variable indicating the approach information, values other than "0" and "1" may be used provided that two kinds of values can be expressed.

Further, the distance threshold value for the determination may be changed depending on the situation, for example, a distance threshold value for determination when the vehicle is approaching the specific point and that when the vehicle is moving away from the specific point may be different.

Therefore, in a case where the fixed threshold value is used, an area recognized as close to the specific point is a circle, but other forms may be adopted.

Hereinafter, the operation of the car navigation system 100 will be described with reference to FIG. 3 to FIG. 12.

In the car navigation system 100, when a destination is set by the operation from the operation input unit 3 while the vehicle is traveling, the controller 7 starts the navigation operation.

Another possible alternative example is that the camera 6 starts photographing in response to a control command which is output from the controller 7 to the camera 6 when the navigation unit 40 determines that the vehicle is close to the specific point.

When the camera 6 is supplied with power and is activated in response to the control command, the camera 6 starts its photographing (capturing an image).

In this example, the camera 6 is attached to, for example, the rear part of the vehicle currently traveling on a highway with one lane at such an angle that it photographs a road surface behind the vehicle.

Figure 4:
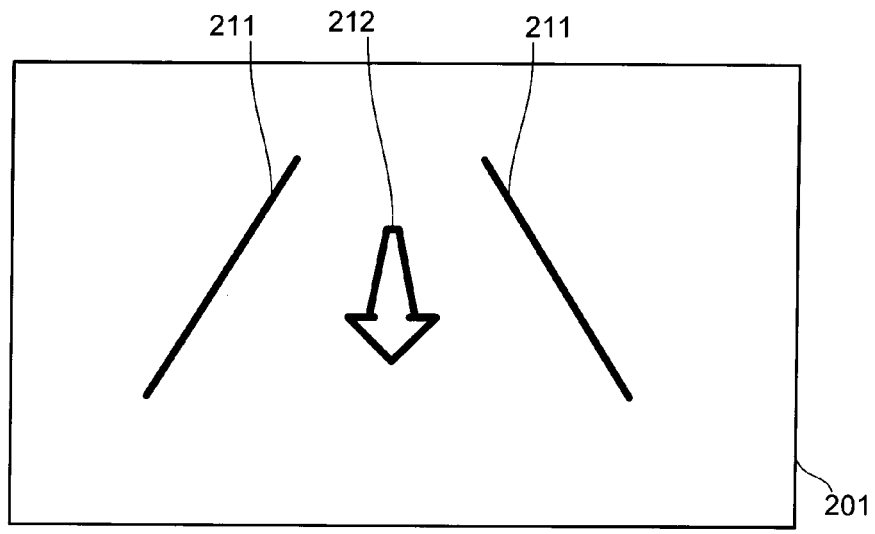
FIG. 4 is a view showing an example of an image corresponding to a video of an area behind a vehicle downloaded from a camera.

Therefore, as shown in FIG. 4, in a captured image 201 of a screen, lane lines 211 on both sides of the road as depicted in perspective are displayed, and depending on a timing, an arrow marking 212 (mark) for ahead-only traffic direction is displayed in a center portion of the road.

Figure 3:
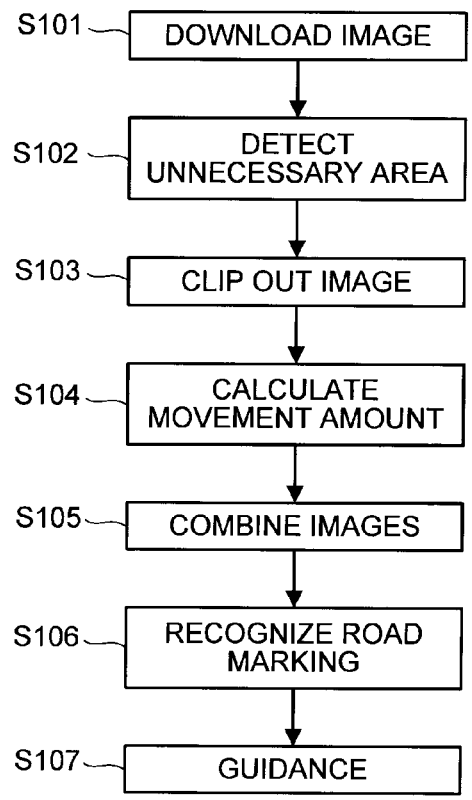
FIG. 3 is a flowchart showing the operation of the car navigation system.

When the camera 6 starts its operation and a captured video is input to the first image processing unit 10, the screen downloading unit 11 downloads the input video in the storage unit 7*b* at a rate of 30 screens per second (30 screens/sec) (Step S101 in FIG. 3).

This downloading rate is an example and may be about ten screens per second (10 screens/sec) or about five screens per second (5 screen/sec).

The first image processing unit 10 applies various kinds of processing to the image obtained from the camera 6 and converts the resultant image to an image suitable for the recognition of the road marking.

In this case, a case where the input image is a color image will be assumed. The first image processing unit 10 first converts the color image stored in the storage unit 7*b* to a gray image. For example, the first image processing unit 10 converts the color image read from the storage unit 7*b* to an image of a YUV color system, and by extracting Y (brightness) components, obtains the gray image.

Next, the first image processing unit 10 applies perspective transformation to the gray image resulting form the conversion.

The perspective transformation is processing to transform a projected image behind the vehicle to an image seen from directly above the road surface.

Subsequently, the first image processing unit binarizes the gray image having subjected to the perspective transformation. This is processing to express values of individual pixels by two kinds of values with respect to a prescribed threshold value.

Figure 5:
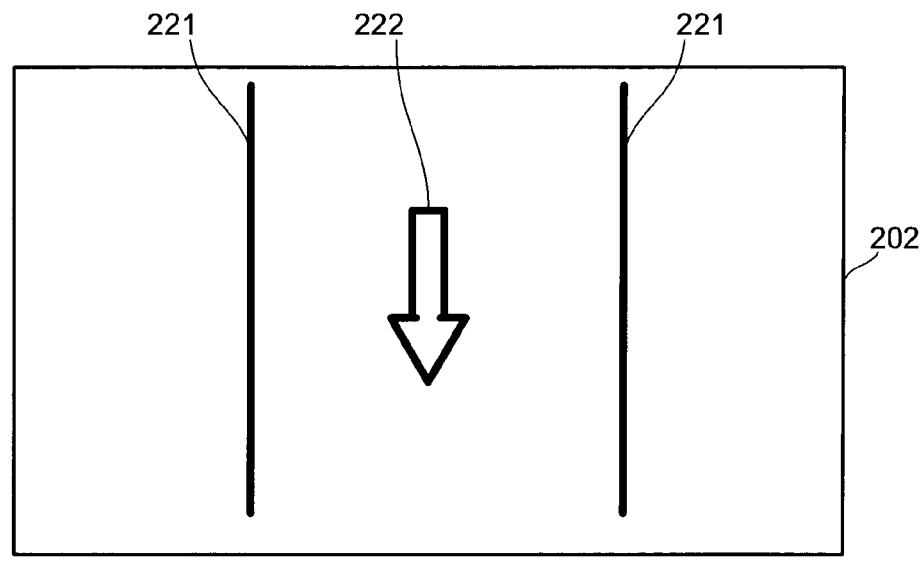
FIG. 5 is a view showing an example of an image resulting from perspective processing applied to the image in FIG. 4.

For example, a black pixel is expressed as "1" and a white pixel is expressed as "0". By the processing so far, the projected image in FIG. 4 is transformed to a monochrome road surface binary image 202 as seen from directly above the road surface as shown in FIG. 5.

In the road surface binary image 202, the lane lines 221 are parallel and an arrow marking 222 is also directed straight downward. The road surface binary image 202 having subjected to the transformation is stored in the storage unit 7*b*.

It should be noted that the processing and method described above are only examples, and other processing and method may be used without departing from the purport of obtaining the information suitable for the recognition.

Further, the combination of processing to be executed may be changed or part thereof may be deleted, according to the kind of the input image (color, gray scale, or the like) and the contents of recognition processing executed next.

In this example, the processing to binarize the image is executed in the first step after the road surface image is obtained, but alternatively, for example, it may be executed prior to the recognition of the road surface marking (before S106 in FIG. 3) after the image composition (after S105 in FIG. 3). Further, the binarization processing of the image is not essential and may be omitted.

The scenery images captured by the camera while the vehicle is traveling on the road, even if captured at the same point, differ depending on various conditions such as the time, weather, and so on.

Figure 6:
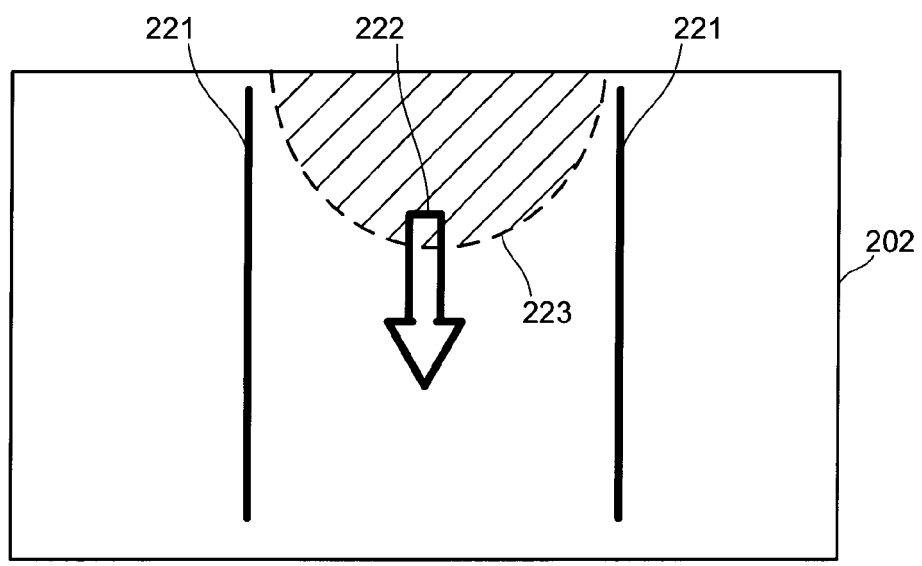
FIG. 6 is a view showing a state where part of a road making is indiscriminatable due to the influence of a headlight.

For example, in the road surface binary image 202 which is generated by the perspective transformation applied to the image obtained from the camera while the vehicle is traveling on the road at night, an image 223 portion has a higher brightness value than the other portion due to the influence of a headlight of a vehicle behind, as shown in FIG. 6.

In this example, part of the marking 222 overlaps with the image 223 with a high brightness value, and the shape of an overlapping portion S is indiscriminatable.

Therefore, in this car navigation system, the unnecessary area detecting unit 12 detects an area unnecessary for the recognition of the marking 222 (unnecessary area) from the road surface binary image 202 (S102) to detect the overlapping portion S with a high brightness value and combines another image as a complement for the overlapping portion S.

As a method of this detection and complementing, there are the following two methods: a first method of first detecting a background portion of the image and clipping out the other area as the unnecessary area; and a second method in which a portion where a time-series image change in several sequentially downloaded images is constant is clipped out as the unnecessary area.

In the first method, for instance, the unnecessary area detecting unit 12 detects, among the areas of the road surface binary image 202, an area in which brightness distribution of the background is constant, that is, an area which has to be left (necessary area).

The area other than the necessary area, that is, an area where the brightness distribution greatly changes is detected as the unnecessary area (what is called a deletion area).

Thereafter, the unnecessary area portion of the downloaded image is complemented by an old image already stored in the storage unit 7*b* or a partial image area thereof, whereby the composite image is generated.

The aforesaid unnecessary area detection processing can be executed for every captured road surface image, and the necessary area determined from the first road surface image may be fixedly used as it is.

Further, in the second method, a portion where a time-series image change is constant is detected as the unnecessary area.

Figure 8:
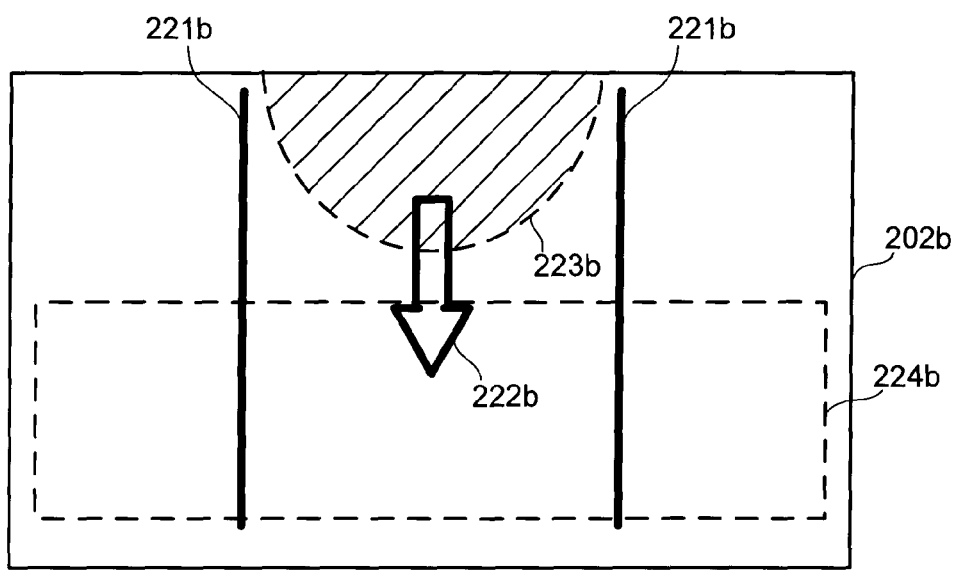
FIG. 8 is a view showing how a partial image is clipped out from a new image downloaded after the image in FIG. 7.

At this time, as shown in FIG. 8, the unnecessary area detecting unit 12 compares a newly obtained road surface binary image 202*b* and an old road surface binary image 202*a* already stored in the storage unit 7b to clip out an image area 224 in a predetermined shape (rectangular shape or the like) excluding an image area where a positional change is equal to or less than a predetermined value.

For example, while the vehicle is traveling at a constant speed, a vehicle behind is also following at substantially the same speed, and therefore, between an image 223a portion and an image 223b portion having a high brightness value due to the influence of the headlight of the vehicle behind, there is little positional change, but a positional change between the arrow markings 222a, 222b portions is great.

Therefore, the unnecessary area detecting unit 12 detects, as the unnecessary portion, the images 223a, 223b (the light irradiated portion of the road surface) between which a brightness change is greater than in the background portion with constant brightness distribution, or the image 223a portion and the image 223b portion between which there is a less positional change.

The image clip-out unit 13 sequentially clips out, from the road surface binary images 202a, 202b, the image areas 224 in the predetermined shape excluding the unnecessary area 223a and the image 223b portion detected by the unnecessary area detecting unit 12 (S103), and stores them in the storage unit 7b.

At this stage, since it is not possible to determine whether or not the marking 222 is included, the image areas 224 in the rectangular shape which are long in a road width direction are clipped out.

After the image areas are clipped out and stored, the movement amount calculating unit 21 of the second image processing unit 20 then reads the old and new image areas 224a, 224b (hereinafter, referred to as "clipped images") from the storage unit 7b. An image in FIG. 9 is the clipped image 224a which is the immediately preceding image, and an image in FIG. 10 is the clipped image 224b newly obtained this time.

The two clipped images 224a, 224b read by the movement amount calculating unit 21 are images corresponding to an area behind the vehicle photographed by the camera 6 attached to the vehicle, and therefore, the road marking and so on move from the upper to lower sides of the screen (image).

Figure 9:
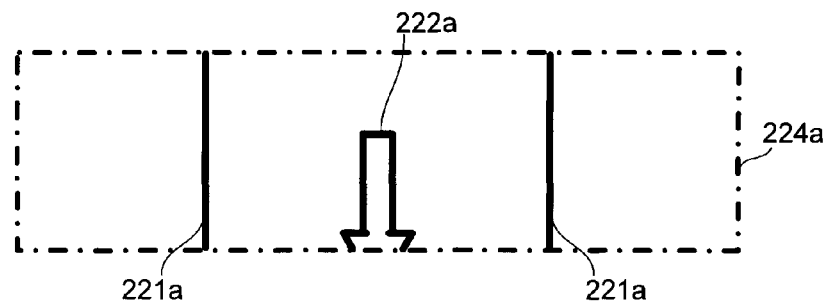
FIG. 9 is a view showing the clipped image clipped out from the immediately preceding image in FIG. 7.
Figure 10:
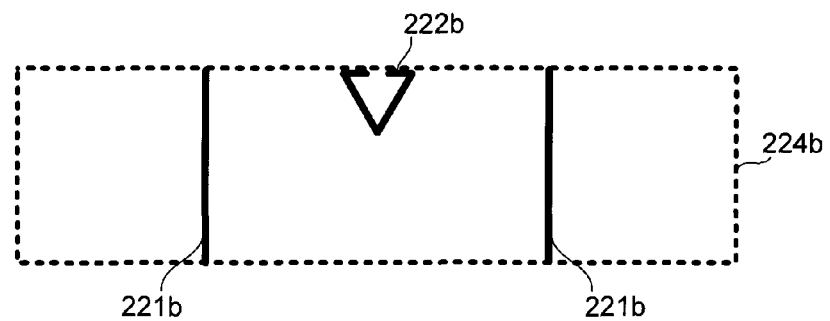
FIG. 10 is a view showing the new clipped image clipped out from the image in FIG. 8.

That is, the marking 222a in the image 224a in FIG. 9 moves upward as is shown by the marking 222b in the image 222b in FIG. 10. Even though an image of the arrow mark being the marking 222b in the image 224b in FIG. 10 has moved upward, a change of the lane lines 221a in the image 224a is not recognized since the lane-line markings 221a in FIG. 9 and the lane-line markings 221b in FIG. 10 are parallel lines.

The number of these plural clipped image 224a and clipped image 224b is not limited to two, but it is also possible to store a large number of them in the storage unit 7b as far as the memory capacity of the storage unit 7b permits.

The movement amount calculating unit 21 calculates a movement amount based on the two clipped images 224a, 224b read from the storage unit 7b (S104).

As a method of calculating the movement amount between the two clipped images 224a, 224b, a generally known cross-correlation coefficient is used. There are other various kinds of methods of calculating the movement amount and any of the other methods may be used.

Figure 11:
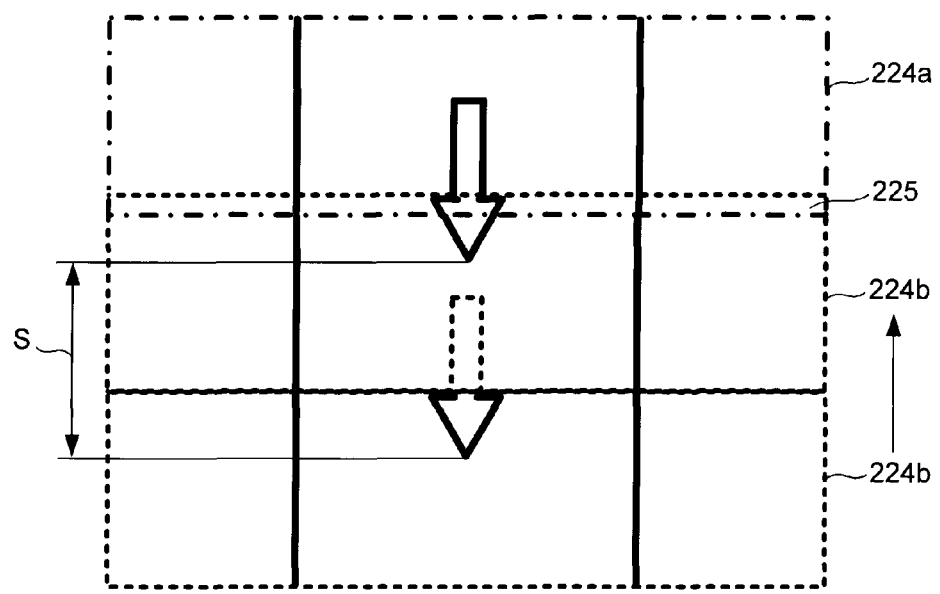
FIG. 11 is a view showing how the two clipped images are combined.
Figure 12:
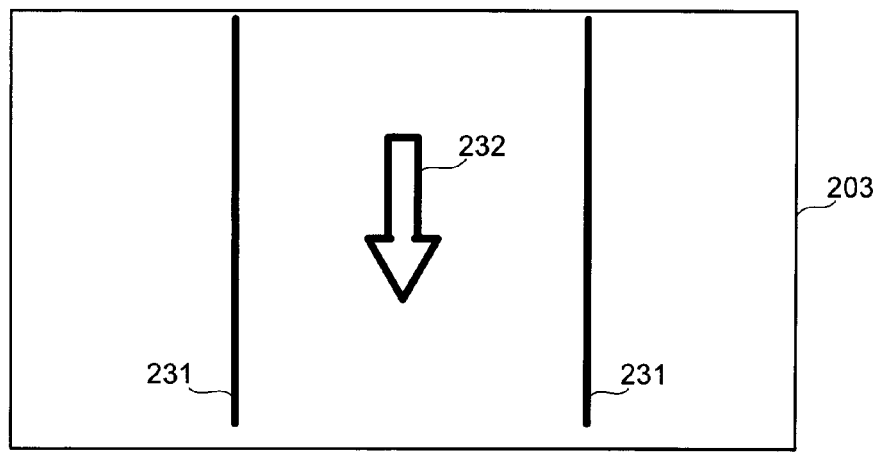
FIG. 12 is a view showing a generated composite image.

The image combining unit 22 combines the clipped images 224a, 224b as shown in FIG. 12, with the clipped image 224b shifted by the movement amount S calculated by the movement amount calculating unit 21 as shown in FIG. 11 (S105), and stores the composite image 203 in the storage unit 7b.

In the composite image 203, it is possible to obtain an image where the portion influenced by the headlight from the vehicle behind is eliminated and only the road surface markings (the lane-line markings 231 and the ahead-only marking 232) are present.

In the processing by the image combining unit 22, the clipped images 224a, 224b are overlapped, with the clipped image 224b being shifted by a distance (number of pixels) corresponding to the movement between the two clipped images 224a, 224b.

As for an area 225 where the both images overlap with each other, an average of both pixels may be taken.

In the above processing, the scenery images of the road behind the vehicle, which are captured by the camera 6, are sequentially downloaded, so that an image free of the influence of the headlight or the like of the vehicle behind is obtained, and an image suitable for the recognition processing of the road marking can be generated.

Incidentally, in the above description, the two clipped images 224a, 224b are used for the image composition, but in the case where sequential processing is performed, the composition may be performed by holding a preceding composite image and calculating a movement amount based on the composite image and a new partial image.

Further, as for the composite image 203, old clipped images are combined with clipped images newly obtained time after time, but it is also possible to reduce a use area of the storage unit 7b (image buffer) by clipping them with an appropriate image size for the composition processing.

The movement amount calculated by the movement amount calculating unit 21 increases in proportion to the traveling speed of the own vehicle on which the camera 6 is mounted.

As the traveling speed increases, an overlapping portion between sequential partial images decreases to none, which may lead to a failure to perform the image composition.

Therefore, by calculating the optimum shape of the clipped image according to the movement amount calculated by the movement amount calculating unit 21, the overlapping between the images is maintained.

Specifically, when the vehicle speed is high, the vertical length of the clipped images is increased, and on the other hand, when the vehicle speed is low, the vertical length of the clipped images is decreased.

Figure 7:
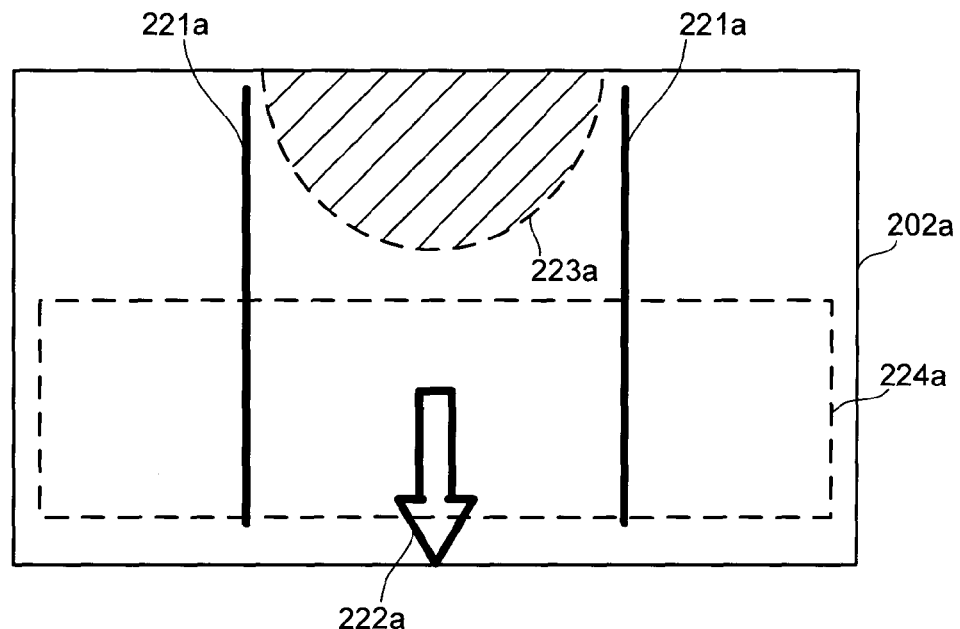
FIG. 7 is a view showing how a partial image is clipped out from an immediately preceding image.

Further, for example, when the image area 223a, shown in FIG. 7, having high brightness due to the headlight of the vehicle behind comes to a nearer side due to sudden approach of the vehicle behind, the image area 223a enters the clipped image 224a, which may possibly result in the generation of a composite image not suitable for the image recognition processing.

In such a case, the position of the clipped image 224a may be changed by the following method. That is, the generated composite image 203 is divided into blocks with a uniform size and average brightness in the blocks made by the division is found.

When it is found, as a result of the examination of the distribution of the average brightness, that there is a block locally having a high brightness value, it is determined that a high-brightness area is included in the composite image and the set position of the clipped image 224a is changed to a nearer side of the own vehicle.

The composite image generated as a result is suitable for the image recognition processing.

When the movement amount calculated by the movement amount calculating unit 21 is substantially zero, that is, there is no difference between the new and old clipped images, the image combining unit 22 may be configured not to execute the composition processing.

When the composite image 203 is stored in the storage unit 7b, the road marking recognizing unit 30 extracts information which is necessary for recognizing the road marking, from the composite image 203 generated and stored by the second image processing unit 20, and recognizes the road marking based on the extracted information (S106).

Here, a concrete example of the processing for recognizing the road marking by the road marking recognizing unit 30 will be described.

The road marking recognizing unit 30 first obtains the composite image 203 from the storage unit 7b.

Next, the road marking recognizing unit 30 extracts straight lines in the image by applying Hough transformation to the obtained composite image 203 and obtains parameters such as the coordinates of the straight lines. Hereinafter, the processing up to the acquisition of the parameters of the straight lines will be called "straight line detection".

The road marking recognizing unit 30 recognizes road markings such as the aforesaid lane-line markings 231, and ahead-only marking (marking of the arrow mark) 231, based on conditions determined in advance for the road markings and the parameters of the straight lines.

The conditions determined in advance for the road markings are set as, for example, "a portion where the straight line extends in the vertical direction from end to end" in a case of the lane lines 221 shown in FIG. 5, "a portion in a shape of a vertically long rectangular shape with a triangle added to a portion thereunder" in a case of the traffic directional marking (arrow mark), and the like.

When the straight lines and the like in the image are extracted, the road marking recognizing unit 30 recognizes the ahead-only marking (arrow mark) 232 painted between the left and right lane-line markings 231 in the composite image 203 by using the extracted information.

The road marking such as the ahead-only marking (arrow mark) 232 is recognized as follows.

Specifically, the road marking recognizing unit 30 first executes processing for specifying a range of the ahead-only marking (arrow mark) 23 included in the composite image 203.

This processing is executed by using projection or the like.

The ahead-only marking (arrow mark) 232 is between the two lane-line markings 231.

Therefore, by taking projections in the vertical axis direction and the horizontal axis direction, features of the ahead-only marking (arrow mark) 232 and the lane-line markings 231 appear in the distribution of projection values in these axes directions, and the range of the ahead-only marking (arrow mark) 232 in the image is specified based on these features.

Here, with reference to FIG. 13 and FIG. 14, a description will be given of the processing (projection processing) in which the road marking recognizing unit 30 specifies, by the projection, the range of the ahead-only marking (arrow mark) 232 included in the composite image 203.

Figure 13:
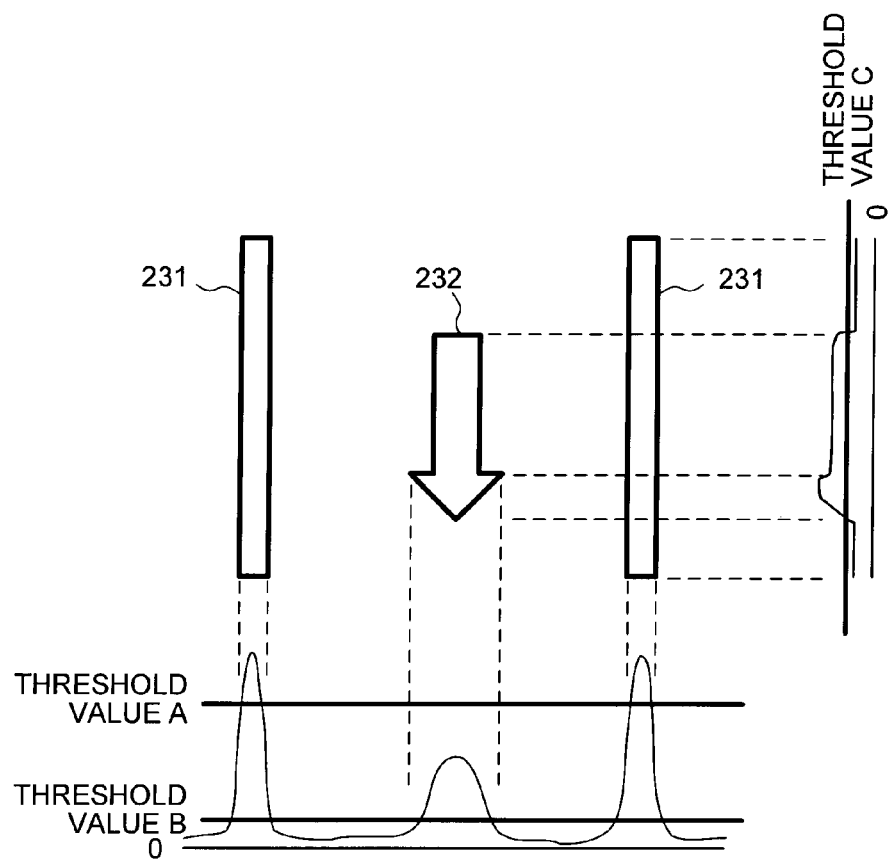
FIG. 13 is a view showing an example of projection processing for specifying a range of a road marking such as an arrow on a road surface.
Figure 14:
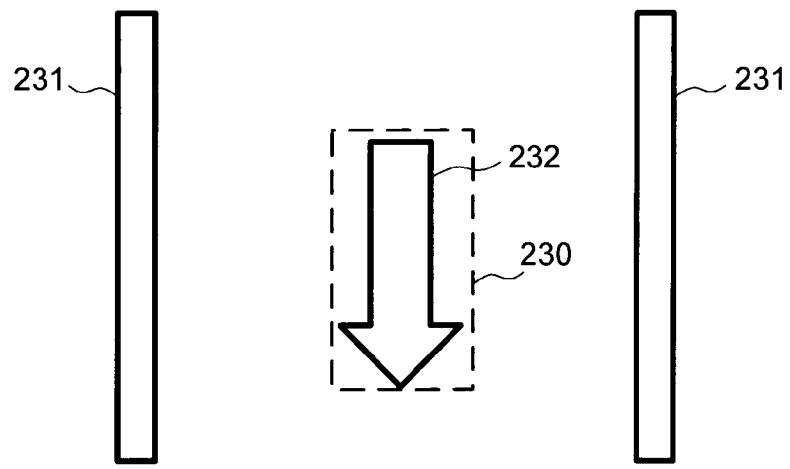
FIG. 14 is a view showing a method of specifying the range of the marking based on the result of the projection processing in FIG. 13.

FIG. 13 is a view showing an example of the projection processing and FIG. 14 is a view showing a method of specifying the range of the marking based on the result of the projection processing.

It is assumed that, prior to the projection processing, the first image processing unit 10 applies white/black inversion processing to the road surface binary image 202 (see FIG. 5) in order to count a portion of the marking as a black pixel.

As shown in FIG. 13, the road marking recognizing unit 30 first counts the number of black pixels at each position on the horizontal axis and detects a portion where a count value of the number of black pixels exceeds a predetermined threshold value A.

It is assumed that, prior to the projection processing, the white/black inversion processing is applied to the road surface binary image in order to count the marking portion as a black pixel.

The road marking recognizing unit 30 regards thus detected portion as the portion corresponding to the lane-line marking 231, and if the portion corresponding to the lane-line marking 231 is detected at two places, it narrows down a search range of the road marking on the horizontal axis to a range sandwiched by the portions corresponding to the lane-line markings 231.

Next, the road marking recognizing unit 30 detects, in the narrowed search range of the road marking, a portion whose value exceeds a threshold value B which is decided in advance as a smaller value than the threshold value A, and determines this portion as a range on the horizontal axis where the marking 232 of the arrow mark is present.

Next, as for the vertical axis direction, the road marking recognizing unit 30 similarly counts a value of the number of black pixels at each position on the vertical axis, and detects a portion where the count value of the number of black pixels exceeds a predetermined threshold value C.

The road marking recognizing unit 30 determines thus detected portion as a range on the vertical axis where the marking 232 of the arrow mark is present.

Then, the road marking recognizing unit 30 combines the determined ranges on the horizontal axis and on the vertical axis where the road marking is present and specifies the combined range as a range 230 of the marking 232 of the arrow mark as shown in FIG. 14.

Next, the road marking recognizing unit 30 applies road marking recognition processing to the determined range 230 of the marking 232 of the arrow mark.

For this road marking recognition processing, a marking information database (hereinafter, referred to as "marking information") in which a plurality of sets of reference binary images of markings such as arrows and labels indicating the names thereof is used.

The label is a general name of a road marking, or a code, the number, or the like assigned to each road marking based on a specific rule.

After enlarging or reducing the binary image of the specified range 230 of the marking 232 of the arrow mark according to the size of the reference binary image of the road marking stored in the marking information of the ROM 7c, the road marking recognizing unit 30 collates the resultant image with the binary image of each road marking in the marking information, calculates the number of value matching between dots at the same position, and defines the result as "similarity degree".

Then, the road marking recognizing unit 30 outputs, as the recognition result, the label of the binary image of the road marking in the marking information, whose calculated similarity degree is the highest.

Incidentally, instead of employing the above-described method, another method may be employed in which numerical values such as density/direction component of the road marking are found from the image in the specified range 230 of the marking 232 of the arrow mark to generate multi-dimensional vector data, its inner product with vector data of each reference road marking stored in the marking information is calculated as "similarity degree", and a label of an image with the highest similarity degree in the marking information is output as the recognition result.

Based on the label recognized by the road marking recognizing unit 30, the navigation unit 40 recognizes the road marking (traffic directional marking) painted on the road surface as the ahead-only marking (arrow mark) 232 and based on this recognition and the result obtained when the GPS receiver 1 measures the current position of the own vehicle, the navigation unit 40 gives guidance on whether or not the vehicle is correctly traveling along a route instructed by the navigation (S107).

As described above, according to the car navigation system of the first embodiment, the image area excluding the portion unnecessary for the recognition (good-condition image area suitable for the recognition) is clipped out from the scenery image captured by the camera 6, and the clipped image area is combined with the immediately preceding clipped image already stored in the storage unit 7*b*, which makes it possible to accurately detect and recognize the road marking, resulting in improved accuracy in the recognition of the traveling direction of the vehicle.

Further, instead of fixedly clipping out a partial image area from the video, by clipping out a partial image area in the shape excluding an image of a road surface whitened by, for example, a headlight of a vehicle behind, which is an obstacle to the recognition of the road marking, and combining the partial area with a past clipped image, it is also possible to generate an image suitable for the recognition of the road marking, resulting in improved accuracy in the recognition of the traveling direction of the vehicle.

Next, a second embodiment of the present invention will be described. The second embodiment is a modification example of the first embodiment, and the same structures as those of the first embodiment will be denoted by the same reference numerals and symbols, and description thereof will be omitted.

The hardware configuration of a car navigation system of the second embodiment is the same as that shown in FIG. 1, and some functions are added to the functional configuration shown in FIG. 2.

Figure 15:
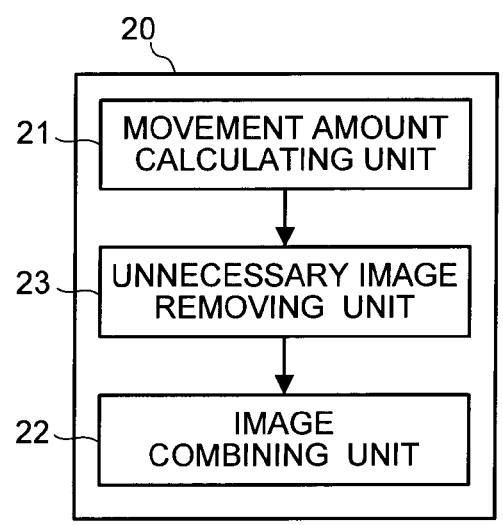
FIG. 15 is a block diagram showing the structure of a car navigation system of a second embodiment.

Specifically, as shown in FIG. 15, the car navigation system includes an unnecessary image removing unit 23 in a second image processing unit 20. Besides, the second embodiment includes the first image processing unit 10, the road marking recognizing unit 30, the navigation unit 40, the storage unit 7*a*, the ROM 7*c*, the disk drive 2, and so on which are shown in FIG. 2.

The unnecessary image removing unit 23 functions as an unnecessary area detecting unit which detects an image of an object whose recognition is not necessary, by comparing a new image area stored in the storage unit 7*b* and an old image area already stored in the storage unit 7*b* (held image).

The unnecessary image removing unit 23 combines an image area extracted from the old image area (held image) which is stored in the storage unit 7*b* and does not include the unnecessary object, in place of an image area of the detected unnecessary object.

The unnecessary image removing unit 23 functions as an erasing unit erasing, from the composite image, an image portion of the object whose recognition is not necessary.

That is, the unnecessary image removing unit 23 detects, for example, a pole, a guardrail, or the like on a road shoulder (roadside) which is higher than the road surface level, by using the processing result of the movement amount calculating unit 21.

Figure 16:
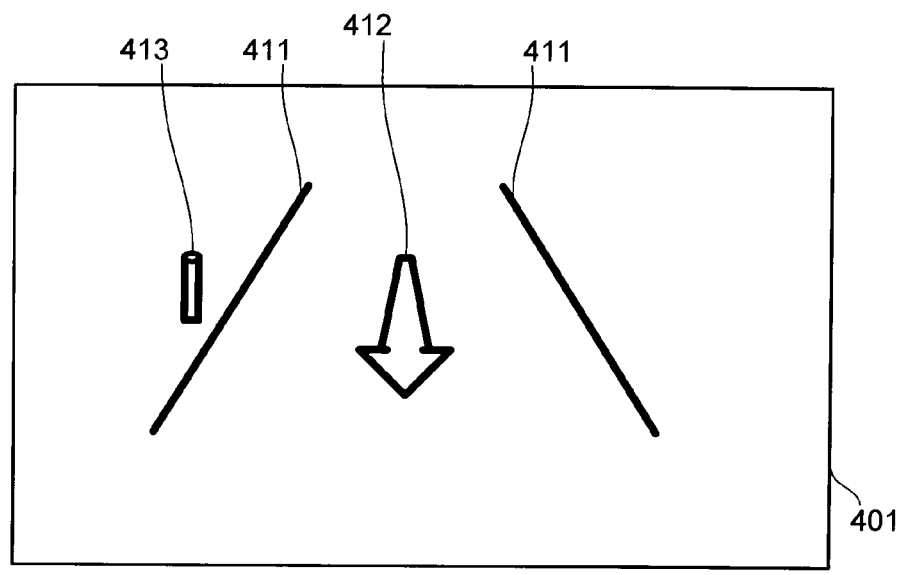
FIG. 16 is a view showing an image of a road photographed by a camera.

FIG. 16 shows a road photographed by a camera.

An image 401 is an image on a back-view monitor mounted on a vehicle, and the image 401 includes two lane lines 411, a road marking 412 indicating ahead-only, and a pole 413 on the roadside.

Figure 17:
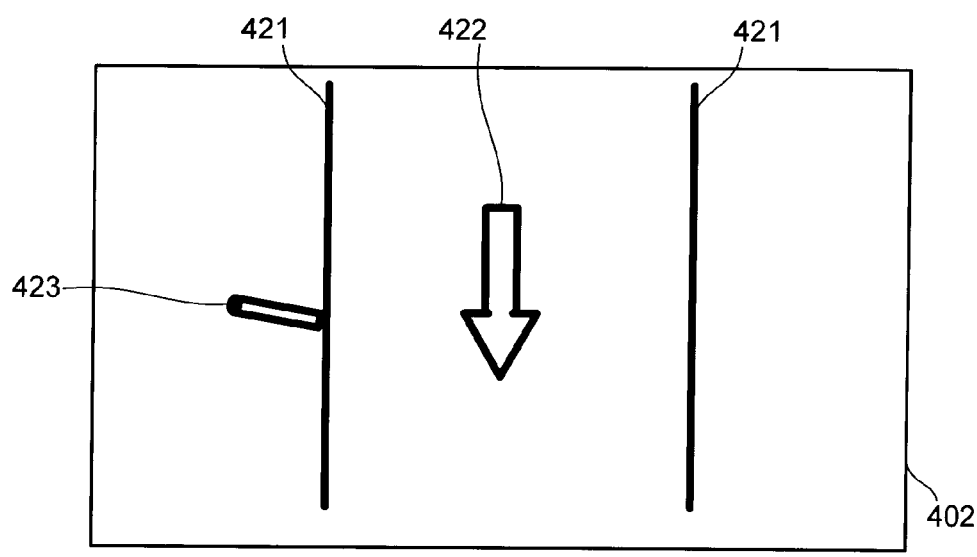
FIG. 17 is a view showing an image resulting from perspective transformation applied to the image in FIG. 16.

FIG. 17 shows an image 402 resulting from the perspective transformation processing which is applied to the image 401 in FIG. 16 as pre-processing of the image clip-out unit 13.

As a result of the perspective transformation processing, an image of a roadside pole 423 higher than the road surface level is inclined relative to lane-line markings 421 and a road marking 422 which are present on the road surface level.

Figure 18:
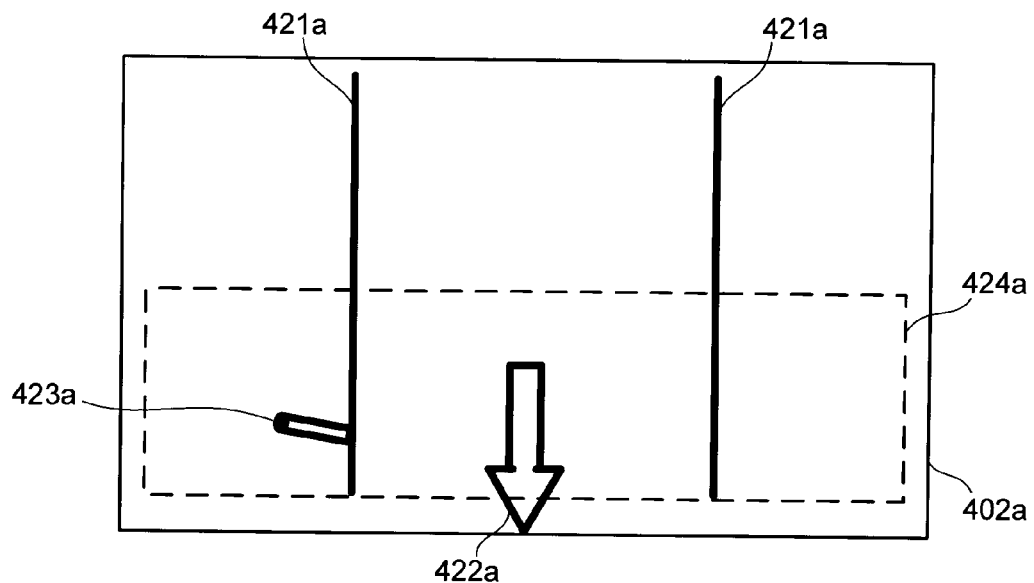
FIG. 18 is a view showing an image resulting from perspective transformation processing applied to scenery image of a road photographed at a certain timing and having a pole on a roadside.
Figure 19:
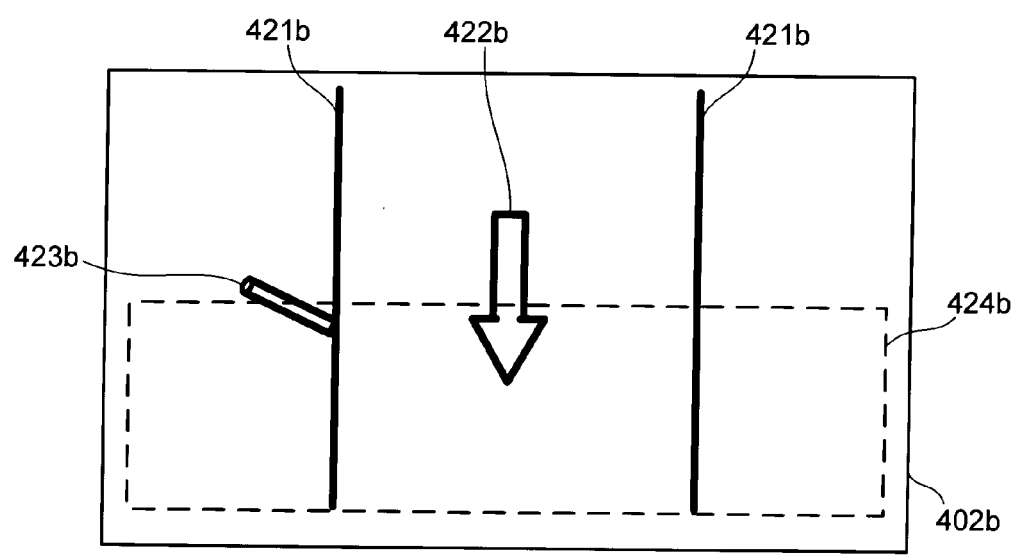
FIG. 19 is a view showing an image resulting from perspective transformation processing applied to an image captured after the image in FIG. 18.

FIG. 18 and FIG. 19 show images generated by the perspective transformation processing which is applied as pre-processing of the image clipping to road scenery images continuously downloaded.

The images shown in FIG. 18 and FIG. 19, similarly to those of the first embodiment, are images from the camera 6 attached to the vehicle, and therefore, road marking and so on included in the images move from the lower side to the upper side.

A road marking 422*a* in a image 402*a* in FIG. 18 moves upward as shown by a road marking 422*b* in an image 402*b* in FIG. 19, but since a movement amount is small, there is substantially no change in its shape.

However, a roadside pole 423*a* in FIG. 18 is an object higher than the road surface level, and therefore, after a predetermined time passes, a roadside pole 423*b* is at a different position in the image 402*b* in FIG. 19 and how it is seen, that is, its shape changes.

This is caused by the influence of the perspective transformation processing being pre-processing of the image clip-out unit 13, and the farther the pole 423*a* goes, the larger its deformation amount is.

Such perspective transformation as the pre-processing is followed by the clip-out processing which is applied by the image clip-out unit 13 to the images 402*a*, 402*b* in FIG. 18 and FIG. 19, and after a partial image 424*a* in FIG. 18 and a partial image 424*b* in FIG. 19 are clipped out to be stored in the storage unit 7*b*, the movement amount calculating unit 21 calculates a movement amount based on the new and old clipped images stored in the storage unit 7*b*.

The unnecessary image removing unit 23 calculates an image matching degree between the two images according to the movement amount calculated by the movement amount calculating unit 21.

The matching degree is found in such a manner that the partial images are divided into blocks, are arranged with one of them being shifted by the calculated movement amount, and a cross-correlation coefficient is calculated in each of the blocks.

In this example, the matching degree between the road marking 422*a* in FIG. 18 and the road marking 422*b* in FIG. 19 is high.

On the other hand, the roadside pole 423*a* in FIG. 18 and the roadside pole 423*b* in FIG. 19 have different shapes due to the influence of the aforesaid perspective transformation processing even though they are the same object, and thus the matching degree therebetween is not high.

As a result, the unnecessary image removing unit 23 determines that an unnecessary object higher than the road surface level is present in the block in which the matching degree is not high.

In the recognition of the road marking, an object other than that at the road surface level is nothing but noise. Therefore, by notifying an image area where this object is present to the subsequent-stage image recognition processing, it is possible to prevent mistaken recognition and shorten the processing time.

In a case where an area behind the vehicle is photographed by the camera, "an obstacle having a height" is simply recognized from a road surface image captured by the camera, but when an obstacle with a height is recognized while the road in front of the vehicle is being photographed by a camera which is, for example, mounted on a front portion of the vehicle, it is also possible not only to recognize a currently displayed road marking but also to call a driver's attention to this obstacle by alarm during the navigation.

Further, in a case of the aforesaid pole present on the roadside, by the image combining unit 22 not combining an image area corresponding to this portion, it is possible to reduce a storage amount of image data as well as to prevent mistaken recognition and shorten the processing time.

In the description of the foregoing second embodiment, the roadside pole is taken as an example, but the unnecessary image removing unit 23 not only cope with a roadside pole but also is capable of similarly processing, for example, a vehicle traveling on the side of the own vehicle, a vehicle behind the own vehicle and in the same lane, or the like since they are objects higher than the road surface level and thus are not necessary for the recognition of the road marking.

Hereinafter, an application example of the car navigation system of the second embodiment described above will be described with reference to FIG. 20 to FIG. 23.

This application example is an example to cope with a case where a road marking is hidden by a shadow on a road surface.

Figure 20:
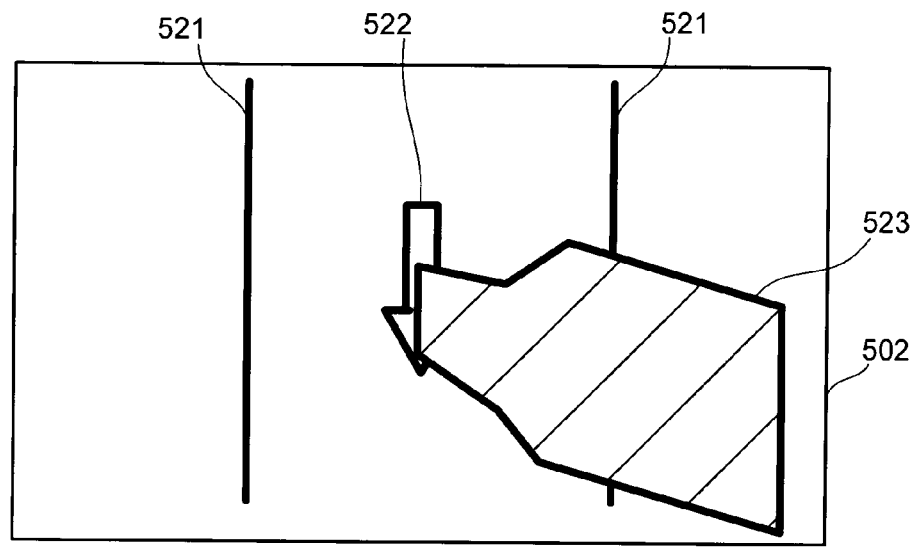
FIG. 20 is a view showing a state where a road marking is hidden due to the influence of a shadow.

FIG. 20 shows an image 502 having subjected to the perspective transformation processing being pre-processing of the image clip-out unit 13.

The image 502 shown in FIG. 20 includes not only lane-line markings 521 and a road marking 522 but also a shadow 523 of a vehicle on an adjacent lane.

The shadow 523 hides part of the road marking 522.

When the road marking recognition processing is applied to the image including such a shadow 523, it is difficult to obtain the correct recognition result.

Figure 21:
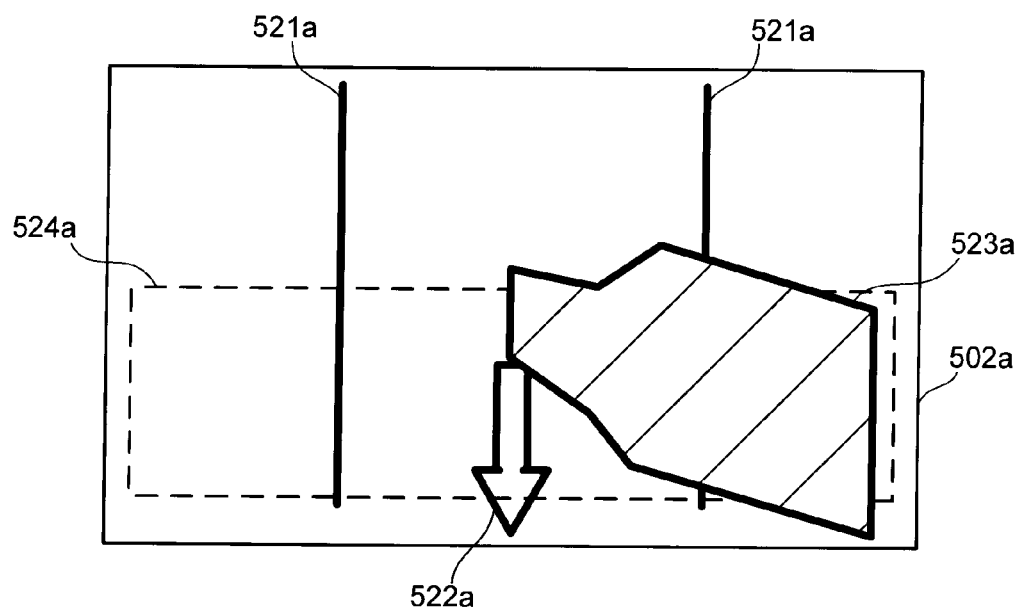
FIG. 21 is a view showing an image resulting from perspective transformation processing applied to scenery image of a road captured at a certain timing and including the shadow.
Figure 22:
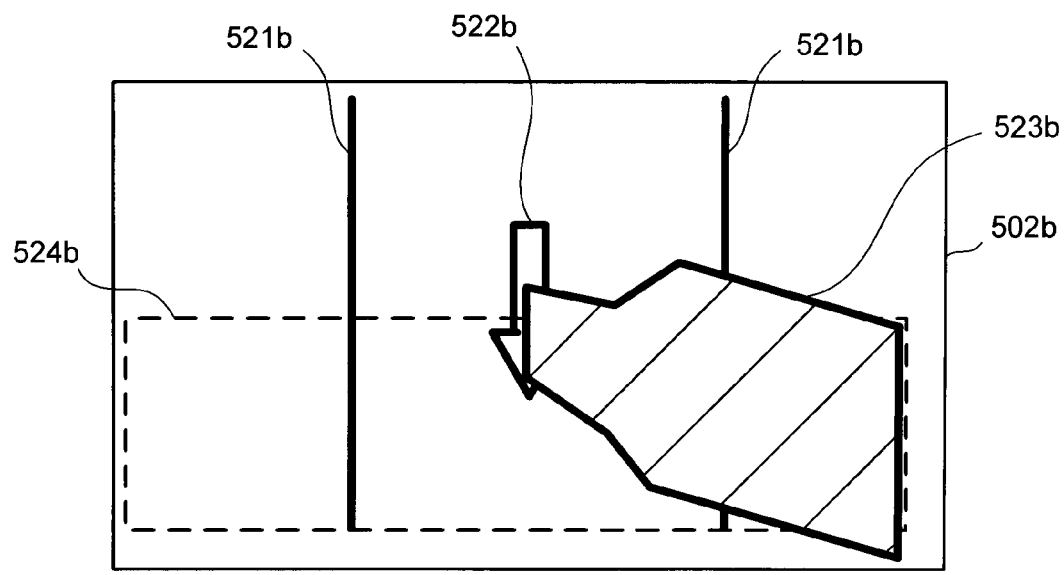
FIG. 22 is a view showing an image resulting from perspective transformation processing applied to an image captured after the image in FIG. 21.

FIG. 21 and FIG. 22 show images 502a, 502b resulting from the perspective transformation processing, as the pre-processing of the image clip-out unit 13, which is applied to successive scenery images.

As in the first embodiment, since the images 502a, 502b are images from the camera 6 attached to the vehicle, the road markings in the image move from the lower side to the upper side.

A road marking 522a included in the image 502a in FIG. 21 moves upward as shown by a road marking 522b in the image 502b in FIG. 22.

In both of the images 502a, 502b in FIG. 21 and FIG. 22, the road markings 522a, 522b are partly hidden by shadows 523a, 523b of the adjacent vehicle.

Therefore, if a clipped image 524a in FIG. 21 and a clipped image 524b in FIG. 22 are used as they are for image composition, the shadow portion is left, which makes it difficult to generate an image suitable for the recognition of the road marking.

Figure 23:
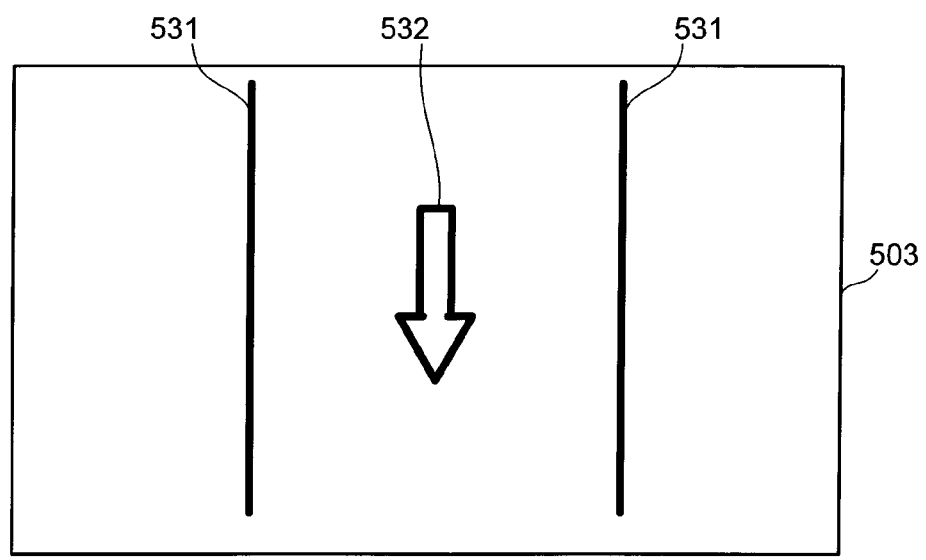
FIG. 23 is a view showing an image generated by combining another image area already stored, in place of an image area having the shadow, thereby removing the shadow.

In this case, the image is generated by combining images in the clipped portions (clipped images), or several pieces of the whole images of respective screens downloaded from the camera 6 are held in the storage portion 7b and an image in good condition among them is used, which makes it possible to generate a composite image without the shadow, such as a road marking 532 in an image 503 shown in FIG. 23.

That is, in the road marking 522a in the image 502a in FIG. 21, part of the shadow 523a overlaps with a stick portion of the arrow, but in the road marking 522b in the image 502b in FIG. 22, the shadow 523b does not overlap with the stick portion of the arrow.

Therefore, the image combining unit 22 selects, from the respective images, partial areas without the shadow and combines these partial areas.

At this time, for the determination on the presence/absence of the shadow, for example, the whole image is divided into block areas, brightness distribution in each block is measured, a block darker than the surrounding area is detected, and this portion is determined as a shadow.

As described above, according to the car navigation system of the second embodiment, the effect of the above-described first embodiment is obtained, and besides, the unnecessary image removing unit 23 provided in the second embodiment removes an unnecessary image area such as, for example, a roadside pole or a shadow of another vehicle traveling on the side of the own vehicle, which is an obstacle to the recognition of the road marking, and the removed unnecessary image area is complemented by a past image in good condition, which enables accurate detection and recognition of the road marking to improve accuracy in the recognition of the traveling direction of the vehicle.

That is, by the perspective transformation processing and the measurement of the matching degree between local images, it is possible to detect an object (roadside pole or the like) which is higher than the road surface level and thus is not necessary for the recognition of the road marking, and it is possible to erase the object from the image, and this portion can be complemented by another held image.

Further, when the road marking is hidden by the shadow or the like, an image where the road marking is not hidden or its partial image is selected from several pieces of images of screens which are held in advance in the storage unit 7b, and is combined with the image with the hidden road marking, whereby it is possible to generate a clear image where the road marking is not hidden.

As a result of these, it is possible to improve accuracy in the recognition of the vehicle traveling direction executed on a subsequent stage.

It is a matter of course that the present invention is not limited to the above-described embodiments, but various modifications may be made therein within a range not departing from the spirit of the present invention.

The above embodiments describe the examples where an image of a photographed area behind the vehicle is processed, but an image of a photographed area in front of the vehicle may be processed.

What is claimed is:

1. A car navigation system, comprising:
a camera mounted on a vehicle, with a shooting direction directed forward or backward from the vehicle, and capturing an image including at least a road surface in front of or behind the vehicle;
a storage unit in which the image captured by said camera is stored;
a first image processing unit detecting an area unnecessary for recognition of a road marking included in the image captured by said camera;
a second image processing unit combining an old image already stored in said storage unit or a partial image area of the old image as a complement for the unnecessary area detected in the image by said first image processing unit, to generate a composite image; and a marking recognizing unit detecting and recognizing the road marking painted on the road surface by using the composite image generated by said second image processing unit and pre-set marking information.

2. The car navigation system according to claim 1,
wherein said first image processing unit or said unnecessary area detecting unit detects an image area where an object unnecessary for the recognition of the road marking is present, by comparing the new image area stored in said storage unit and several old image areas already stored in said storage unit; and
wherein said second image processing unit or said image combining unit combines an image area which is extracted from the old image area stored in said storage unit and not including the unnecessary object, in place of the detected image area of the unnecessary object.

3. The car navigation system according to claim 2, comprising,
an erasing unit erasing, from the composite image, the image area of the unnecessary object detected by said first image processing unit or said unnecessary area detecting unit.

4. A car navigation system, comprising:
a camera mounted on a rear part of the vehicle, with a shooting direction directed backward from the vehicle and capturing a video including at least a road surface behind the vehicle;
a storage unit in which an image is storable; and
a screen downloading unit sequentially downloading the videos captured by said camera into said storage unit at predetermined time intervals in a unit of a screen;
an unnecessary area detecting unit detecting an area unnecessary for recognition of a road marking included in the image of the screen downloaded into said storage unit;
an image clip-out unit clipping out an image area in a predetermined shape not including the unnecessary area detected by said unnecessary area detecting unit, to store the clipped image area into said storage unit;
a movement amount calculating unit calculating a movement amount by comparing the new image area stored in said storage unit by said image clip-out unit and an immediately preceding old image area already stored in said storage unit;
an image combining unit generating a composite image by combining the new and old image areas according to the movement amount of the road marking calculated by said movement amount calculating unit; and
a road marking recognizing unit detecting and recognizing the road marking by using the composite image generated by said image combining unit and pre-set marking information.

5. The car navigation system according to claim 4,
wherein said image clip-out unit includes a clipped image changing unit changing a shape or an arrangement of the image area which is to be clipped out from the image of the screen, according to the movement amount calculated by said movement amount calculating unit.

6. The car navigation system according to claim 5,
wherein said clipped image changing unit changes a position of the image area which is to be clipped out from the image of the screen, according to a detected state or a recognized state of the road marking included in the composite image.

7. The car navigation system according to claim 5,
wherein the clipped image changing unit changes a position of the image area which is to be clipped out from the image of the screen, depending on time.

8. The car navigation system according to claim 4,
wherein said first image processing unit or said unnecessary area detecting unit detects an image area where an object unnecessary for the recognition of the road marking is present, by comparing the new image area stored in said storage unit and several old image areas already stored in said storage unit; and
wherein said second image processing unit or said image combining unit combines an image area which is extracted from the old image area stored in said storage unit and not including the unnecessary object, in place of the detected image area of the unnecessary object.

9. The car navigation system according to claim 8, comprising an erasing unit erasing, from the composite image, the image area of the unnecessary object detected by said first image processing unit or said unnecessary image detecting unit.

* * * * *